US011745881B2

(12) United States Patent
Rainville

(10) Patent No.: US 11,745,881 B2
(45) Date of Patent: Sep. 5, 2023

(54) FUEL CELL STACK ARRAY

(71) Applicant: Bell Helicopter Textron Inc., Fort Worth, TX (US)

(72) Inventor: Joseph Dean Rainville, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 1169 days.

(21) Appl. No.: 16/257,750

(22) Filed: Jan. 25, 2019

(65) Prior Publication Data

US 2020/0239149 A1  Jul. 30, 2020

(51) Int. Cl.
| | |
|---|---|
| *B64D 27/24* | (2006.01) |
| *H01M 8/04537* | (2016.01) |
| *H01M 8/04858* | (2016.01) |
| *H01M 8/04664* | (2016.01) |
| *B64C 27/04* | (2006.01) |
| *B64D 41/00* | (2006.01) |

(52) U.S. Cl.
CPC .............. *B64D 27/24* (2013.01); *B64C 27/04* (2013.01); *B64D 41/00* (2013.01); *H01M 8/0488* (2013.01); *H01M 8/04559* (2013.01); *H01M 8/04567* (2013.01); *H01M 8/04679* (2013.01); *B64D 2041/005* (2013.01); *H01M 2250/20* (2013.01)

(58) Field of Classification Search
CPC .............. B64D 2041/005; H01M 8/24; H01M 8/04559; H01M 8/04589; H01M 8/04619; H01M 8/04649; H01M 8/04679; H01M 8/0488

See application file for complete search history.

(56) References Cited

U.S. PATENT DOCUMENTS

| | | | | |
|---|---|---|---|---|
| 2005/0084726 A1* | 4/2005 | Dickman | .......... | H01M 8/04089 429/434 |
| 2015/0210171 A1* | 7/2015 | King | ....................... | B60L 50/10 29/825 |

* cited by examiner

*Primary Examiner* — Christopher P Domone
(74) *Attorney, Agent, or Firm* — Lightfoot & Alford PLLC

(57) ABSTRACT

A stack fuel cell array featuring paired fuel-cell systems combined to generate 540 VDC for a rotorcraft. Power from the hydrogen-based fuel cells is provided to the rotorcraft. A rated electrical load of the rotorcraft helps determine how many paired fuel-cell systems are needed during any fuel-cell systems failures. Each of the paired fuel-cell systems is coupled to an electrical load of the rotorcraft. The system detects any fuel cell failures and removes other working fuel cells as needed to balance the electrical system.

16 Claims, 5 Drawing Sheets

FUEL CELL STACK ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventional rotorcraft utilize combustion engines for propulsion and power generation, and these engines produce noise and environmentally harmful emissions. Fuel cells can provide direct current (DC) power without harmful emissions for propulsion and other uses. Conventionally, fuels cells are utilized with DC-DC converters for regulation of voltage and current from the fuel cells.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
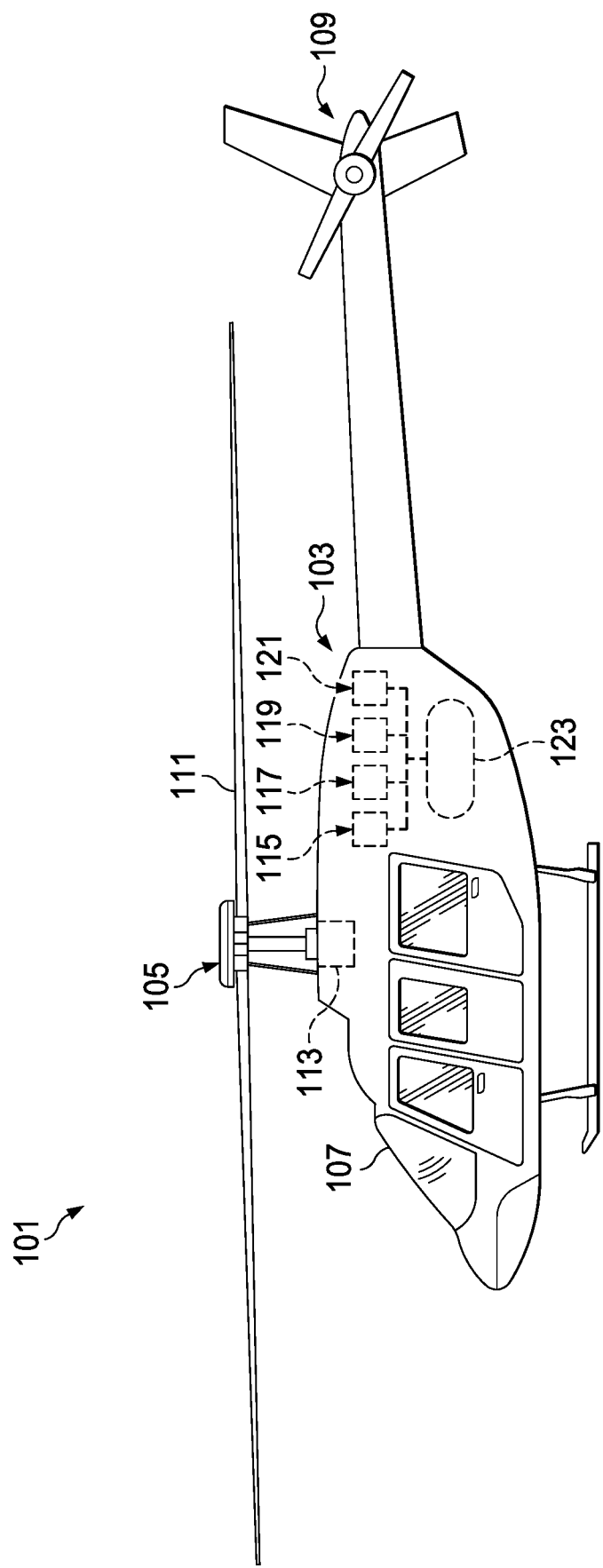
FIG. 1 is a side view of a rotorcraft incorporating a fuel cell stack array according to this disclosure.

This disclosure describes a fuel-cell system configured to provide a nominal 540 volts of DC power from pairs of fuel cells forming an electrical bus. FIG. 1 illustrates a rotorcraft 101 equipped with a fuel-cell system 103 according to this disclosure. Rotorcraft 101 comprises a main-rotor system 105 carried by a fuselage 107 and a tail-rotor system 109 carried by the fuselage 107. Rotor system 105 comprises main-rotor blades 111 and is driven in rotation by electric motor 113 to provide lift for rotorcraft 101, system 105 being controlled with a plurality of control sticks within the fuselage 107. Fuel-cell system 103 comprises a first fuel cell 115, a second fuel cell 117, a third fuel cell 119, a fourth fuel cell 121, and a hydrogen gas tank 123. The fuel-cell system 103 can generate bi-polar +/−DC power generally, and specifically can be used for +/−270 volts, or other bi-polar voltage ranges acceptable in the aerospace field, ranging from +/−150 VDC up to +/−300 VDC, thereby resulting in 300 to 600 volts DC at an electrical load. Electric motor 113 and an entire electrical system of rotorcraft 101 is powered by the fuel-cell system 103. Alternatively, the main-rotor system 105 is driven by a conventional combustion engine and the fuel-cell system 103 provides electrical power to the rest of the rotorcraft 101. Each fuel cell 115, 117, 119, 121 is remotely monitored for voltage production, current generation, fuel supply, and can be independently cycled on and off as needed. While fuel-cell system 103 is illustrated with four fuel cells 115, 117, 119, 121, other combinations are contemplated as long as an even number of fuel cells are providing power during operation.

Figure 2:
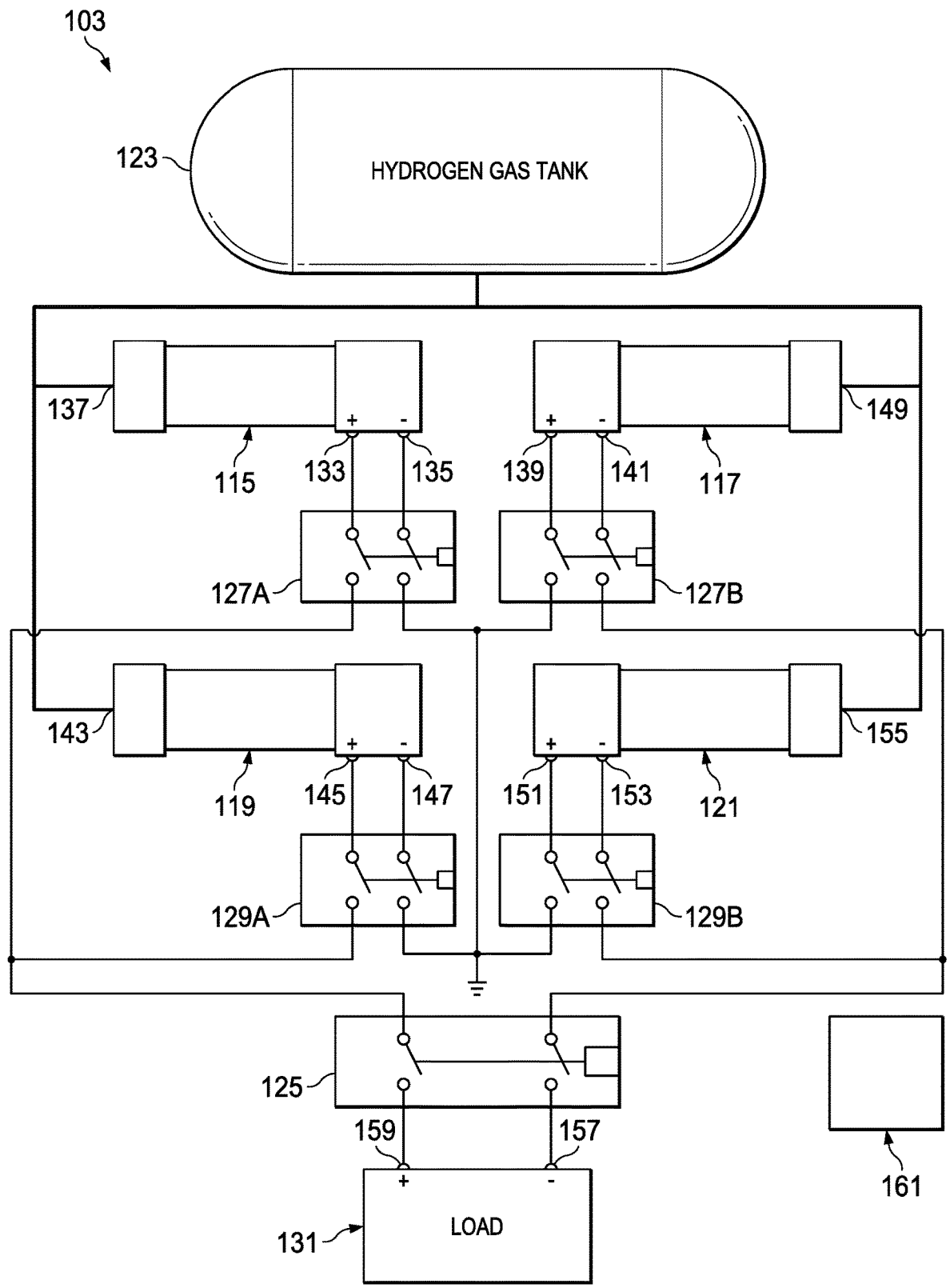
FIG. 2 is a schematic view of the fuel cell stack array of FIG. 1.

FIG. 2 illustrates fuel-cell system 103 according to this disclosure. Fuel-cell system 103 further comprises a first contactor 125, a second contactor 127A, a third contactor 127B, a fourth contactor 129A, and a fifth contactor 129B. During normal operation of fuel-cell system 103, hydrogen gas flows from the hydrogen gas tank 123 into all the fuel cells 115, 117, 119, 121 to produce electrical energy which is available for use by a load 131 of rotorcraft 101. For example, electric motor 113 is powered by fuel-cell system 103 and is typically a portion of load 131. Other powered elements, such as lighting elements, controllers, environmental systems, etc., of rotorcraft 101 are contemplated being a portion of load 131. In addition to the illustrated rotorcraft 101, additional aerospace applications of the fuel-cell system 103 may include; main propulsion, auxiliary power, emergency or back up power onboard powered lift or fixed-wing aircraft such as rotorcraft or VTOL aircraft. This includes helicopters, VTOL aircraft, passenger, cargo propeller or jet aircraft, whether for civilian or military use.

In this disclosure, each fuel cell 115, 117, 119, 121 is referred to as a "positive" or "negative" fuel cell, which indicates the polarity of the node of each cell 115, 117, 119, 121 connected to a common portion of the bus and to an electrical load. The first fuel cell 115 is a positive cell and comprises fuel cell plates, a positive node 133, a negative node 135, and a fuel input 137. The second fuel cell 117 is a negative cell and comprises fuel cell plates, a positive node 139, a negative node 141, and a fuel input 149. The third fuel cell 119 is a positive cell and comprises fuel cell plates, a positive node 145, a negative node 147, and a fuel input 143. The fourth fuel cell 121 is a negative cell and comprises fuel cell plates, a positive node 151, a negative node 153, and a fuel input 155. The positive node 133 of the first fuel cell 115 is electrically coupled to a positive node 159 of load 131 through the first contactor 125 and the second contactor 127A. The negative node 141 of the second fuel cell 117 is electrically coupled to a negative node 157 of load 131 through the third contactor 127B. The negative node 135 of the first fuel cell 115 is electrically coupled to the positive node 139 of the second fuel cell 117 through the second contactor 127A and the third contactor 127B and grounded. The positive node 145 of the third fuel cell 119 is electrically coupled to a positive node 159 of load 131 through the first contactor 125 and the fourth contactor 129A. The negative node 153 of the fourth fuel cell 121 is electrically coupled to a negative node 157 of load 131 through the fifth contactor 129B. The negative node 147 of the third fuel cell 119 is electrically coupled to the positive node 151 of the fourth fuel cell 121 through the fourth contactor 129A and the fifth contactor 129B, grounded, and electrically coupled to node 135, 139.

Contactors 125, 127A, 127B, 129A, 129B are typically remotely controlled and configured to selectively connect and disconnect the fuel cells 115, 117, 119, 121 electrically from the load 131. In alternative embodiments, the contactors 125, 127A, 127B, 129A, 129B can be switches and or relays to isolate the fuel cells 115, 117, 119, 121. In the preferred embodiment, contactors 125, 127A, 127B, 129A, 129B feature integral sensors for voltage detection and current detection. The integral sensors enable the contactors 125, 127A, 127B, 129A, 129B to detect issues with the fuel cells 115, 117, 119, 121 or the load 131. In an alternative embodiment, the sensors are located external to contactors 125, 127A, 127B, 129A, 129B or located inside the fuel cell. If a positive cell 115, 119 must be turned off then, either of the negative cells 117, 121 must be turned off to keep balance.

A positive 270 VDC will exist between the positive node 133 and the negative node 135 and is a positive electrical bus. A negative 270 VDC will exist between the negative node 141 and the positive node 139 and is a negative electrical bus. A positive 540 VDC will exist between the positive node 133 and the negative node 141. A positive 270 VDC will exist between the positive node 145 and the negative node 147. A negative 270 VDC will exist between the negative node 153 and the positive node 151. A positive 540 VDC will exist between the positive node 145 and the negative node 153. The positive 540 VDC from the positive node 133 and the negative node 141 is in parallel with the positive 540 VDC from the positive node 145 and the negative node 153 and applied to load 131.

A health-monitoring system 161 monitors each fuel cell 115, 117, 119, 121 for proper operation. Typically, the system 161 utilizes output voltage of each of the fuel cells 115, 117, 119, 121 in determining which working or failed fuel cell to decouple. In an alternative embodiment, every single cell of the fuel cell 115, 117, 119, 121 would be monitored for a drop in their voltage output. The system 161 is preferably a separate controller from the fuel cells 115, 117, 119, 121 and the contactors 125, 127A, 127B, 129A, 129B, alternatively the system 161 is distributed across and integral within the fuel cells 115, 117, 119, 121 and the contactors 125, 127A, 127B, 129A, 129B. The system 161 selectively couples and decouples the fuel cells 115, 117, 119, 121 via contactors 125, 127A, 127B, 129A, 129B as needed to maintain a balanced system across the electrical busses. For example, as one of the fuel cells 115, 119 that powers the positive bus fails, then the system can decouple the failed fuel cell 115, 119 and decouple another working fuel cell 117, 121 from the negative bus. The system can later recouple the decoupled working fuel cell 117, 121 as needed in case of a failure in the coupled working fuel cell on the negative bus. A failed fuel cell typically will be detected by a drop in an output voltage of the fuel cells 115, 117, 119, 121. The system 161 can be utilized, with appropriate sensors, to detect system failures by detecting large coolant or reactant leaks, low reactant supply pressure, stack over temperature, and contactor failure. Furthermore, the system 161, in addition to output voltage, can selectively couple and decouple the fuel cells 115, 117, 119, 121 based upon an age of the fuel cells 115, 117, 119, 121, a temperature of the fuel cells 115, 117, 119, 121, and/or an efficiency of the fuel cells 115, 117, 119, 121. Control wiring from the stack health monitoring system 161 to the fuel cells 115, 117, 119, 121 and the contactors 125, 127A, 127B, 129A, 129B is not illustrated for clarity purposes. Furthermore, additional fuel cells beyond a quantity of four are contemplated as being utilized. Reserve fuel cells, initially decoupled, can be utilized by system 103 for restoring full operational power in case of an emergency when a fuel cell fails and must be decoupled.

Figure 3:
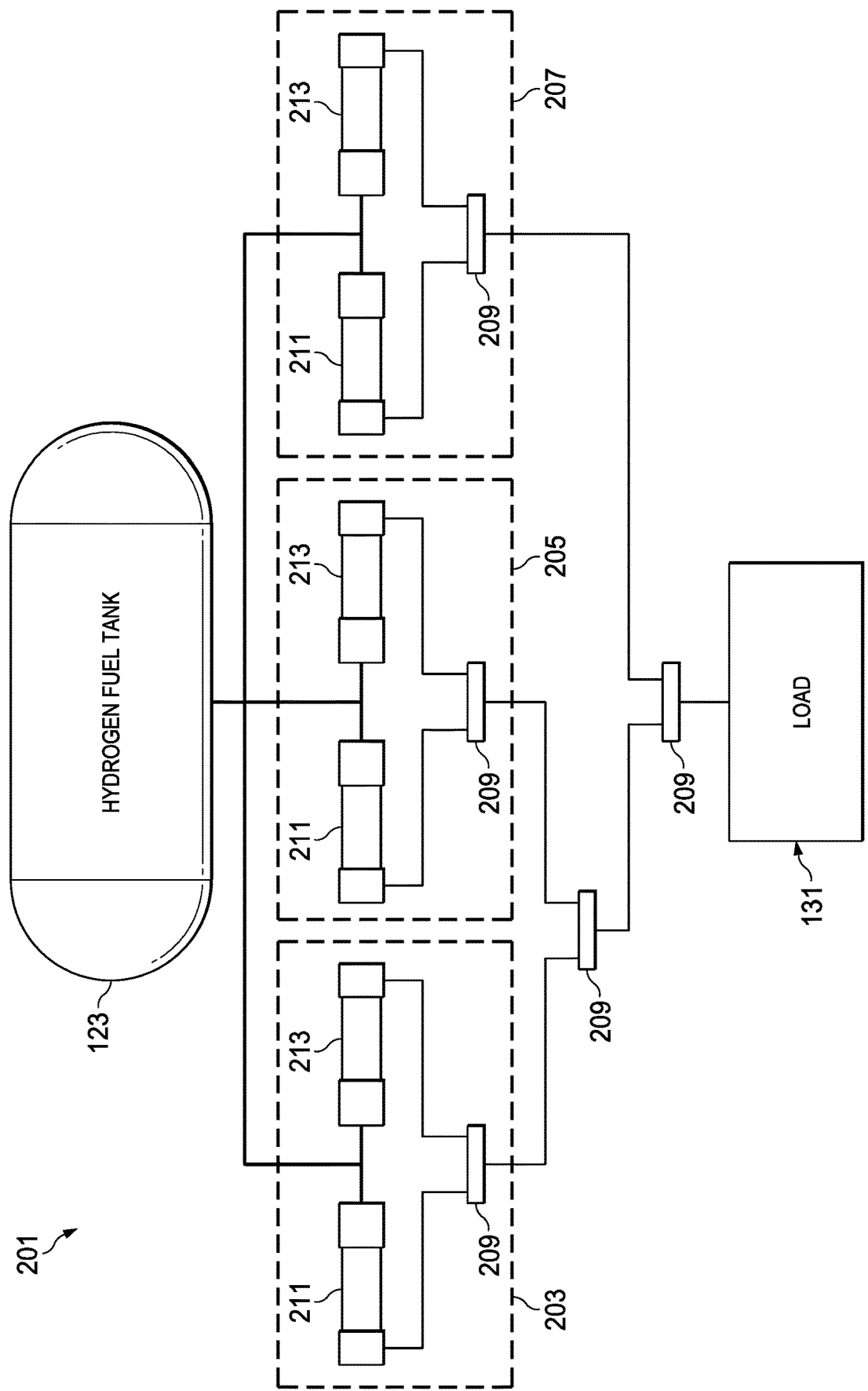
FIG. 3 is a schematic view of another fuel cell stack array according to this disclosure.

FIG. 3 illustrates an alternative fuel-cell system 201 for the rotorcraft 101 according to this disclosure. Fuel-cell system 201 comprises a first paired fuel-cell system 203, a second paired fuel-cell system 205, a third paired fuel-cell system 207, a plurality of smart contactors 209, and a hydrogen gas tank 123. Fuel-cell system 201 utilizes six fuel cells as compared to system 103.

The first paired fuel-cell system 203 comprises a first fuel cell 211 and a second fuel cell 213. The second paired fuel-cell system 205 comprises a first fuel cell 211 and a second fuel cell 213. The third paired fuel-cell system 207 comprises a first fuel cell 211 and a second fuel cell 213. In each of the paired fuel-cell systems 203, 205, 207 the first fuel cell 211 is wired as a positive fuel cell. Additionally, in each of the paired fuel-cell systems 203, 205, 207 the second fuel cell 213 is wired as a negative fuel cell.

Figure 4:
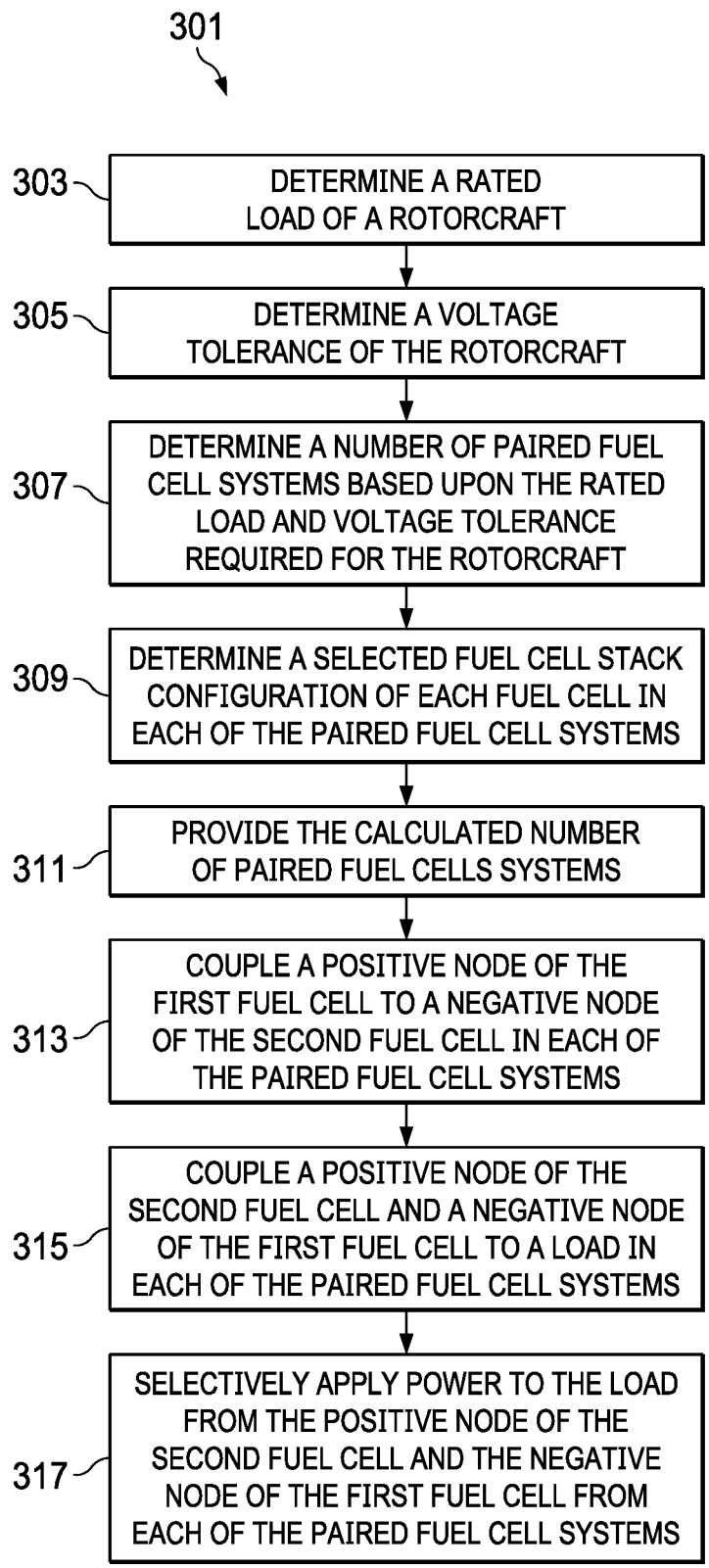
FIG. 4 is a diagram of a method of powering a rotorcraft with bi-polar +/−DC power from the fuel cell stack array according to this disclosure.

FIG. 4 illustrates a method 301 of powering a rotorcraft with ±270 VDC from a fuel cell stack array according to this disclosure. Initially, at block 303 a determination of a rated electrical load of rotorcraft 101 is made. Typically, each power consuming device is documented for power requirements at full load and during startup. Next, at block 305 a determination is made regarding the voltage tolerance for each of the power consuming devices of rotorcraft 101. For example, a flight control computer may have a tolerance of ± a volt whereas the electric motor 113 for propulsion may have a tolerance of ±ten volts. A determination of a number of required paired fuel-cell systems is made at block 307 based upon the power requirements determined in block 303 and the determined voltage tolerances of block 305. The number of required paired fuel-cell systems is chosen so that nominally every power consuming device can be powered by the fuel cell stack array if a paired fuel-cell system is lost during flight.

At block 309 a selected fuel cell stack configuration is determined for each paired fuel-cell system. Next, at block 311 the calculated number of paired fuel-cell systems determined in block 307 is provided. At block 313 the positive node of the first fuel cell 115 is coupled to the negative node of the second fuel cell 117 for each paired fuel-cell system. Then, at block 315 the positive node of the second fuel cell 117 and the negative node of the first fuel cell 115 is coupled to the load 131 for each paired fuel-cell system. Contactors 125, 127A, 127B, 129A, 129B facilitate selectively applying power at block 317 from each paired fuel-cell system to the load 131.

Figure 5:
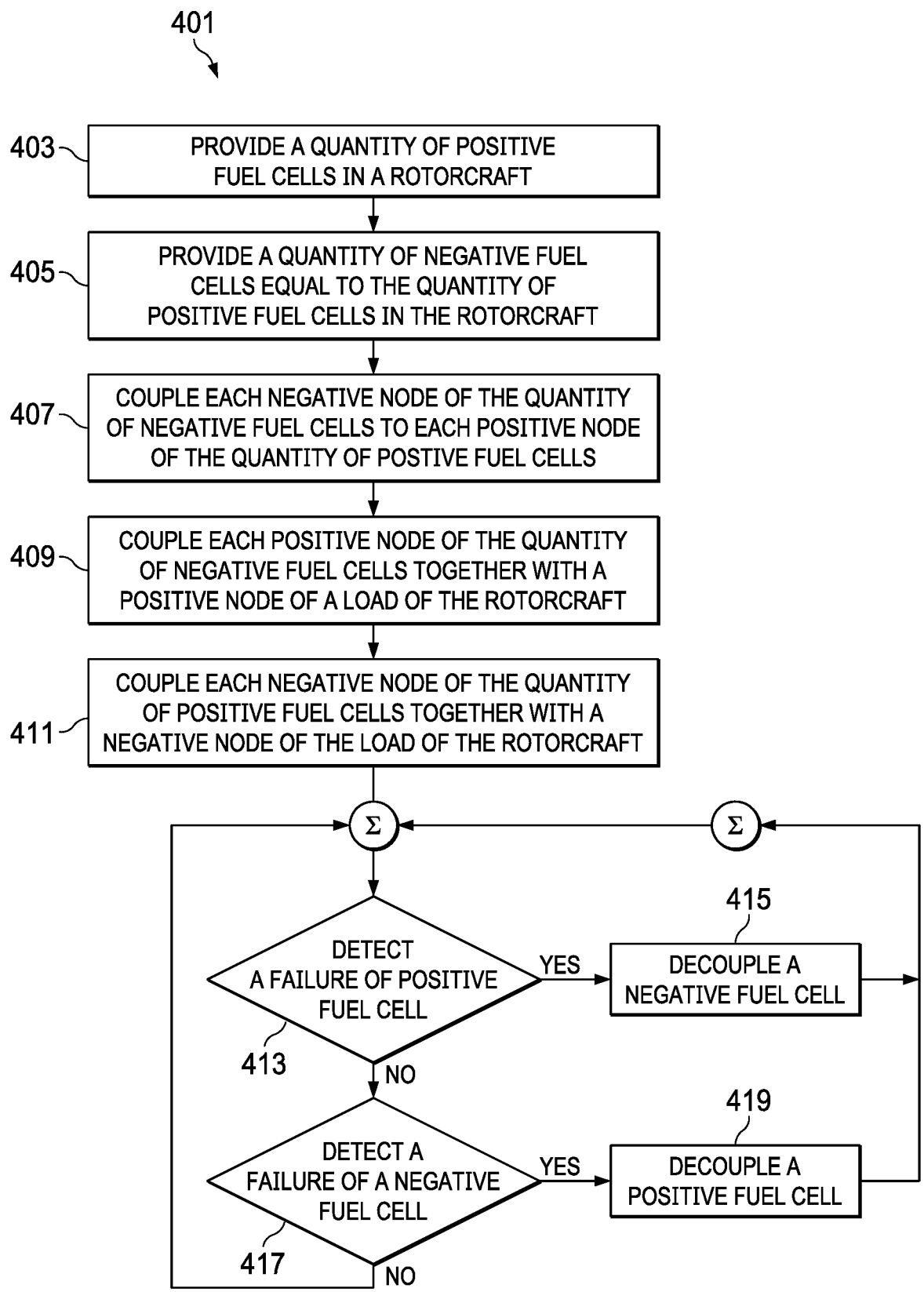
FIG. 5 is a diagram of another method of powering a rotorcraft with bi-polar +/−DC power from the fuel cell stack array according to this disclosure.

FIG. 5 illustrates another method 401 of powering a rotorcraft with ±270 VDC from a fuel cell stack array according to this disclosure. Initially, at block 403 a quantity of positive fuel cells is provided in a rotorcraft 101 based on a calculated expected load of the rotorcraft 101. Next, at block 405 a quantity of negative fuel cells is provided in a rotorcraft 101 equal in quantity to the fuel cells provided in block 403. Each fuel cell stack configuration is determined by ensuring that the aircraft can be powered in the event a negative fuel cell and a positive fuel cell fails. For example, if a single fuel cell fails and another needs to be decoupled to balance the electrical load the remaining fuel cells are able to power the electrical load of the rotorcraft. Alternatively, when a fuel cell fails the remaining working fuel cells can operate at a reduced production to maintain a balance between positive fuel cells and negative fuel cells. Furthermore, each fuel cell stack features a reserve power capacity, typically 5% of the rotorcraft electrical load, to provide additional power in case of failures in remaining fuel cells or in case of emergency.

At block 407 each negative node of the negative fuel cells is electrically coupled to the positive nodes of the positive fuel cells. At block 409 each positive node of the negative fuel cells is electrically coupled to a positive node of an electrical load of the rotorcraft 101. Next, at block 411 each negative node of the positive fuel cells is electrically coupled to a negative node of the electrical load of the rotorcraft 101. At this point, the fuel-cell system can selectively provide power as controlled by contactors 125, 127A, 127B, 129A, 129B. Method 401 further provides control of failed fuel cells at block 413 detecting a failure of a positive fuel cell, if the positive fuel cell fails go to block 415 otherwise go to block 417. At block 415 the system decouples a negative fuel cell in response to a failure in a positive fuel cell to maintain a balanced electrical bus by opening contactors 125, 127A, 127B, 129A, 129B. Once block 415 is complete, the method returns to block 413. Next at block 417 detecting a failure of a negative fuel cell, if the negative fuel cell fails go to block 419 otherwise loop back to block 413. At block 419 the system decouples a positive fuel cell in response to a failure in a negative fuel cell to maintain a balanced electrical bus. Additional fuel cells can be coupled to replace failed fuel cells as needed.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fuel-cell system for powering an electrical load of a rotorcraft, comprising:
   at least two positive fuel cells; and
   at least two negative fuel cells;
   wherein each fuel cell comprises:
      a positive node; and
      a negative node;
      wherein the negative node of each of the positive fuel cells is electrically coupled to the positive node of each of the negative fuel cells;
      wherein the electrical load is coupled to the positive node of each of the positive fuel cells and the negative node of each of the negative fuel cells; and
      wherein each fuel cell is coupled to the electrical load of the rotorcraft without a converter or other power electronics.

2. The fuel-cell system of claim 1, further comprising:
   a contactor;
   wherein the contactor is configured to electrically isolate the electrical load from the fuel cells.

3. The fuel-cell system of claim 1, further comprising:
   a contactor;
   wherein the contactor is configured to electrically isolate the electrical load from the fuel cells; and
   wherein the contactor is configured to detect problems with the electrical load.

4. The fuel-cell system of claim 1, further comprising:
   a contactor;
   wherein the contactor is configured to electrically isolate the electrical load from the fuel cells; and
   wherein the contactor is configured to detect problems with at least one of the fuel cells.

5. The fuel-cell system of claim 1, further comprising:
   a health-monitoring system configured to detect problems with the fuel cells; and
   a contactor for each fuel cell configured to electrically isolate the associated fuel cell from the electrical load;
   wherein in response to the health-monitoring system detecting a problem with a fuel cell,
   the contactor isolates the fuel cell with the problem from the load.

6. The fuel-cell system of claim 1, further comprising:
   at least a third positive fuel cell;
   at least a third negative fuel cell;
   wherein each of the fuel cells is configured to power at least 25% of the electrical load of the rotorcraft.

7. The fuel-cell system of claim 1, wherein each of the fuel cells is configured to power at least 50% of the electrical load of the rotorcraft.

8. The fuel-cell system of claim 1, further comprising:
   at least a third positive fuel cell;
   at least a third negative fuel cell;
   wherein each of the fuel cells is configured to power at least 30% of the electrical load of the rotorcraft.

9. The fuel-cell system of claim 1, wherein each of the fuel cells is configured to power at least 55% of the electrical load of the rotorcraft.

10. A fuel-cell system for powering an electrical load of a rotorcraft, comprising:
    at least two positive fuel cells and at least two negative fuel cells, each fuel cell having a positive node and a negative node, the negative node of each of the positive fuel cells being electrically coupled to the positive node of each of the negative fuel cells, and the electrical load being coupled to the positive node of each of the positive fuel cells and the negative node of each of the negative fuel cells;
a system configured to monitor each fuel cell and detect faulty fuel cells;
a contactor for each fuel cell, each contactor configured to electrically isolate the associated fuel cell from the electrical load;
wherein when the system detects a faulty fuel cell, the contactor associated with the faulty fuel cell isolates the faulty fuel cell from the electrical load, and a contactor for one of the fuel cells having an opposite polarity from the faulty fuel cell isolates the associated fuel cell.

11. The fuel-cell system of claim 10, further comprising:
a contactor;
wherein the contactor is configured to electrically isolate the electrical load from the fuel cells; and
wherein the contactor is configured to detect problems with the electrical load.

12. The fuel-cell system of claim 10, further comprising:
at least a third positive fuel cell;
at least a third negative fuel cell;
wherein each of the fuel cells is configured to power at least 25% of the electrical load of the rotorcraft.

13. The fuel-cell system of claim 10, wherein each of the fuel cells is configured to power at least 50% of the electrical load of the rotorcraft.

14. A fuel-cell system for powering an electrical load of a rotorcraft, comprising:
at least two pairs of fuel cells, each pair comprising a positive fuel cell and a negative fuel cell electrically coupled to each other;
a system configured to monitor each fuel cell and detect faulty fuel cells;
a contactor for each pair, each contactor configured to electrically isolate the associated pair from the electrical load;
wherein when the system detects a faulty fuel cell, the contactor associated with the pair comprising the faulty fuel cell isolates the associated pair from the electrical load.

15. The fuel-cell system of claim 14, further comprising:
a contactor;
wherein the contactor is configured to electrically isolate the electrical load from the fuel cells; and
wherein the contactor is configured to detect problems with the electrical load.

16. The fuel-cell system of claim 14, further comprising:
at least a third pair of fuel cells;
wherein each pair is configured to power at least 50% of the electrical load of the rotorcraft.

* * * * *